the present invention relates to dewatering of an aqueous slurry of calcium carbonate. More particularly, the present invention relates to the use of non-ionic surfactants in dewatering aqueous slurries of an aragonitic precipitated calcium carbonate. Calcium carbonate slurries dewatered using the non-ionic surfactants of the present invention have higher weight percent solids, decreased dispersant demand, and result in higher productivity.

United States Patent [19]
Hansen et al.

[11] Patent Number: 6,123,855
[45] Date of Patent: Sep. 26, 2000

[54] DEWATERING OF CALCIUM CARBONATE

[75] Inventors: Colin Wayne Hansen, Alburtis; Christopher Alan Wener, I, Kunkletown, both of Pa.

[73] Assignee: Minerals Technologies Inc., Bethlehem, Pa.

[21] Appl. No.: 09/255,788

[22] Filed: Feb. 23, 1999

Related U.S. Application Data

[63] Continuation of application No. 08/764,384, Dec. 13, 1996, abandoned.

[51] Int. Cl.$^7$ .................................. C02F 1/52; C02F 1/54
[52] U.S. Cl. ......................... 210/723; 210/728; 210/729; 210/773
[58] Field of Search .................................. 210/723, 728, 210/729, 773

[56] References Cited

U.S. PATENT DOCUMENTS

| | | | |
|---|---|---|---|
| 4,207,186 | 6/1980 | Wang et al. | 210/54 |
| 4,596,661 | 6/1986 | Gill et al. | 210/728 |
| 4,741,838 | 5/1988 | Sharpe, Jr. | 210/710 |

*Primary Examiner*—David A. Simmons
*Assistant Examiner*—Betsey J. Morrison
*Attorney, Agent, or Firm*—Marvin J. Powell; Terry B. Morris

[57] ABSTRACT

The present invention relates to dewatering of an aqueous slurry of calcium carbonate. More particularly, the present invention relates to the use of non-ionic surfactants in dewatering aqueous slurries of an aragonitic precipitated calcium carbonate. Calcium carbonate slurries dewatered using the non-ionic surfactants of the present invention have higher weight percent solids, decreased dispersant demand, and result in higher productivity.

4 Claims, No Drawings

DEWATERING OF CALCIUM CARBONATE

This is a continuation of U.S. Ser. No. 8/764,384, filed Dec. 13, 1996, now abandoned.

FIELD OF THE INVENTION

The present invention relates to dewatering of an aqueous slurry of calcium carbonate. More particularly, the present invention relates to the use of non-ionic surfactants in dewatering aqueous slurries of an aragonitic precipitated calcium carbonate.

Calcium carbonate slurries dewatered using the non-ionic surfactants of the present invention have higher weight percent solids, decreased dispersant demand, and result in higher productivity.

BACKGROUND OF INVENTION

In the production of high gloss paper, a base sheet is coated with white pigment. White pigments include talc, clay, ground calcium carbonate (GCC) and precipitated calcium carbonate (PCC).

PCC has a key advantage over GCC in that smaller average particle sizes with moderate specific surface areas (SSA) are possible, whereas ultra ground CGG has (I) high energy costs for grinding and (ii) higher SSA in the final product due to solid particle morphology. Fine PCC, that is PCC with average particle size of below about 1.6 microns, as produced is too dilute in concentration to be used in paper coating. The need therefore exists to concentrate the aqueous slurry of PCC or remove water from the slurry to render the percent solids of the slurry about 65 weight percent or greater.

Numerous problems result when using vacuum dewatering equipment on calcium carbonate. For example, clogging of the vacuum dewatering machine occurs during paper production. Typically, the vacuum machine must be shutdown, and washed with water, in order to relieve clogging.

Machine downtime increases the overall cost of paper production. Similar problems have been experienced using dewatering technology that employs air-blow type cycles to dry calcium carbonate.

For example, when air-blow type machinery is employed to dewater calcium carbonate products having cake solids of greater than 65 percent and an average particle sizes of less than or equal to 1.6 microns, a more effective air-blow cycle for efficient dewatering of the calcium carbonated is required. Current air blow systems are inadequate at dewatering small average particle size calcium carbonate products to specific solids levels.

Therefore, what has been found to be novel and unanticipated by any prior art is a method for dewatering calcium carbonate slurries where cake solids and average particle size is important aspect of the final product.

PRIOR RELATED ART

European Patent Application No. 0 381 262 A2 discloses a non-aqueous liquid detergent comprising a liquid surfactant phase and a particulate solid detergency builder suspended in the liquid. Such products are alleged to be suitable for the washing of fabrics.

Japanese Kokai Patent No.: Hei 2-277541 discloses a method of producing calcium carbonate aqueous dispersions whereby a high concentration of at least 60% by weight of calcium carbonate is dispersed in water by using an acrylic dispersant in the presence of non-ionic surfactant. The pH of the dispersion obtained is adjusted to between 8 and 9 by blowing in carbon dioxide.

Japanese Kokai Patent Publication No. Sho 60-185892 discloses a composition for coating paper comprising a pigment containing $\geq 50$ wt % of calcium carbonate, a latex and (1) 0.5–5 parts by weight of non-ionic surfactant with a cloud point of $\leq 90°$ C. and (2) 0.5–5 parts by weight of organopolysiloxane with a cloud point of $\leq 60°$ C. per 100 parts by weight of the solids content of the said latex.

Japanese Kokai Patent Publication No. Hei 7-48793 discloses dewatering accelerators for calcium carbonate slurries that contain as their effective component at least one kind of non-ionic surfactant and polyoxyethylene-polyoxypropylenecondensation products. It is alleged that by using these chemicals in dewatering of calcium carbonate slurries, better dewatering and less clogging of the vacuum dewatering machine are attained, and productivity is markedly improved.

Although various methods of dewatering calcium carbonate slurries are known in the art and various chemical dewatering accelerators are also known, none of the related art discloses the use of non-ionic surfactants to dewater an aragonitic precipitated calcium carbonate coating pigment, when higher cake solids and small average particle size of the final product is important.

SUMMARY OF INVENTION

The present invention comprises the use of non-ionic surfactants in dewatering an aqueous slurry of aragonitic precipitated calcium carbonate having an average particle size of less than or equal to about 1.6 microns from about 55 to about 80 weight percent, preferably to greater than or equal to 65 weight percent solids.

It is therefore an object of the present invention to provide a method for using non-ionic surfactants to dewater calcium carbonate slurries in air-blow type dewatering systems. Another object of the present invention is to provide a method for producing a final precipitated calcium carbonate where high solids is important. Still another object of the present invention is to provide a method for producing an aragonitic precipitated calcium carbonate where the average particle size of the final product is less than or equal to about 1.6 microns. A further object of the present invention is to provide a dewatering method that results in increased productivity. Still another object of the present invention is to provide an aragonitic precipitated calcium carbonate dispersion that has reduced dispersant demand.

These and other objects of the present invention will become more apparent upon a further review of the summary and the detailed description which follows.

DETAILED DESCRIPTION OF THE INVENTION

The present invention comprises the use of non-ionic surfactants in dewatering an aqueous slurry of aragonitic precipitated calcium carbonate(PCC) having an average particle size of less than or equal to about 1.6 microns to a solid content of greater than or equal to 65 percent and an average particle size of less than or equal to about 1.6 microns. The particle size was determined by a sedimentation technique using a Micromeritics Sedigraph Model 5100 on an aqueous dispersion of the product at about 3% and using about 0.1% carboxylated polyelectrolyte (Daxad 30)

as a dispersant. In paper making processes employing the method of the present invention, a high solids PCC cake which contains smaller average size PCC particles may be effectively dewatered during the air-blow cycle.

The process for producing the aragonitic PCC composition of the present invention involves the reaction of calcium hydroxide with carbon dioxide.

Equipment Used:
1. Nominal 30 liter Vessel with flat turbine style agitator blades (2) and jacketed for heating/cooling.
2. Slaker unit is a simple cement mixer apparatus.

Raw Materials:
1. CaO
2. Water
3. $CO_2$ Source: 15% $CO_2$ in air
4. M-60 aragonite from Mississippi Lime Company Procedure for aragonitic PCC Synthesis:
1. Prepare a milk of lime of $Ca(OH)_2$ by adding 10 parts water to 1 part CaO under agitation with initial water temperature adjusted to at least about 40 deg. C. Lime amount is 2000 grams and water amount is 20 liters.

Note: The resulting milk of lime (slake) will be at ~11 weight percent solids of $Ca(OH)_2$ slurry. Total amount of slake is ~3200 grams as $CaCO_3$.

2. Screen milk of lime so that it is free of +60 mesh grit. Place slake in 30 liter reactor.
3. Adjust milk of lime temperature to 50 deg. C.
4. Add 160 grams of M-60 aragonite to milk of lime, allow to mix for 15 minutes.
5. Adjust agitation for vigorous mixing and start $CO_2$ gas stream addition. Gas stream rate should be adjusted to allow complete $Ca(OH)_2$ conversion to $CaCO_3$ in about 3 hours.
6. Carbonation is complete when pH falls to 7.0 at which time the $CO_2$ gas introduction is terminated.
7. The completed $CaCO_3$ slurry is ~14 weight percent as $CaCO_3$.
8. The aragonitic PCC is now ready for non-ionic surfactant addition, followed by filtration.

The non-ionic surfactant may be added to the PCC at any stage of the synthesis production process. However, it has been found that when the PCC product stream is screened and transferred to the filter feed tank, the non-ionic surfactant is preferably added to such, under agitation.

In order for the non-ionic surfactant of the present invention to be effective in dewatering PCC the level of non-ionic surfactant employed should be from about 0.1 weight percent to about 0.4 weight percent based on the weight of the calcium carbonate. For the best dewatering performance, the surfactant is not diluted prior to the addition to the PCC slurry. The concentration of the aqueous PCC slurry of at the time of addition of the non-ionic surfactant is from about 5 to about 50 weight percent, (based on the weight of the PCC to the total weight).

The theory of the present invention is based on controlling excessive capillary pressure within the filter/wet cake. It is believed that the non-ionic surfactants of the present invention minimize the capillary pressure within the wet cake by reducing water tension which directly results in a more effective air-blow cycle during dewatering. Water is easily released from the void spaces within the wet cake, or filter cake, as high pressure air displaces the liquid from the PCC filter cake. It should, however, be clearly understood that what has been stated concerning capillary pressure is only a theory of what is believed and merely proffered as a scientific possibly as to what may be occurring. It is not, in any manner whatsoever, being presented as being scientific fact nor is it being offered as being scientifically correct. Therefore, at no instance, and in no circumstances, should this suggested scientific theory be used in any manner whatsoever to in any way limit the scope of this invention.

Non-ionic surfactants that have been found to be effective in the practice of the present invention are selected from the group consisting of polyalkylene glycol ethers, alcohol alkoxylates and alkylphenol-hydroxypolyoxyethylene and the like. The following non-ionic surfactants, which are commercially available from Union Carbide Chemical and Plastics Company, Inc., Industrial Chemical Division, Danbury Conn., include TERGITOL D-683, TERGITOL MIN-FOAM 1X, and TERGITOL MIN-FOAM 2X, TRITON X-100.

(1) Tergitol Min-Foam 2X Surfactant, Formula: $C_{11-15}H_{23-31}O(CH_2CH_2O)_x[CH_2CH_2O/CH_2CH(CH_3)O]_y CH_2CH(CH_3)OH$;

(2) Tergitol D-683 Surfactant, Formula: $C_{15}H_{23}O[CH(CH_3)CH_2O]_x[CH_2CH_2O]_yH$;

(3) Tergitol Min-Foam 1X Surfactant, Formula: $C_{11-15}H_{23-31}O(CH_2CH_2O)_x[CH_2CH_2O/CH_2CH(CH_3)O]_y CH_2CH(CH_3)OH$.

(4) Triton X-100 Formula: $C_{33}H_{60}O_{10.5}$

The following examples are presented to further illustrate the broad aspect of the present invention. The examples are in no way intended to limit the scope, breath or range of the present invention in any material aspect whatsoever. Only the broadest reading and most liberal interpretation of appended claims, as attached hereto, should be used to define the metes, bounds and limits of the present invention.

In the following Examples 1, 2 and 3 both non-ionic treated calcium carbonate slurries (Invention Process) and untreated calcium carbonate slurries (control) are filtered on an air blow type filter press and tested for percent solids. Improved percent solids of the invention process is what was realized in each example.

EXAMPLES

Example 1

An aqueous slurry of aragonitic PCC having a solids content of about 15 weight percent was treated with 0.2 weight percent, based on the weight of the calcium carbonate, TRITON X-100 by adding the surfactant while stirring the aqueous slurry. The percent solids of the filter cakes were measured and compared to an untreated PCC filter cake (No surfactant) the results are shown in Table 1.

TABLE 1

| TRITON X-100 @ 0.2 weight % | | No Additive | |
|---|---|---|---|
| Cycle # | % Solids | Cycle # | % Solids |
| 1 | 67.37 | 1 | 53.7 |
| 2 | 67.07 | 2 | 57.06 |
| 3 | 67.27 | 3 | 53.53 |
| 4 | 67.79 | 4 | 52.4 |
| 5 | 67.21 | | |
| 6 | 66.62 | | |

TABLE 1-continued

| TRITON X-100 @ 0.2 weight % | | No Additive | |
|---|---|---|---|
| Cycle # | % Solids | Cycle # | % Solids |
| | _ = 67.22 | | _ = 54.17 |
| | σ = 0.3827 | | σ = 2.01 |

Fill time of 2 minutes, Squeeze time of 3 minutes @ 15 bar, Air blow time of 5 minutes

Example 2

An aqueous slurry of aragonitic PCC having a solids content of about 15 weight percent was treated with 0.2 weight percent, based on the weight of the calcium carbonate, TERGITOL MIN-FOAM 2X, by adding the surfactant while stirring the aqueous slurry. The percent solids of the filter cake were measured and compared to an untreated PCC filter cakes (no surfactant) the results are shown in Table 2.

TABLE 2

| TERGITOL MIN-FOAM 2X @ 0.2 weight % | | No Additive | |
|---|---|---|---|
| Cycle # | % Solids | Cycle # | % Solids |
| 1 | 62.62 | 1 | 53.61 |
| 2 | 69.05 | 2 | 50.92 |
| 3 | 68.32 | 3 | 51.03 |
| 4 | 68.81 | 4 | 51.27 |
| 5 | 69.36 | 5 | 51.69 |
| | _ = 67.63 | | _ = 51.70 |
| | σ = 2.827 | | σ = 1.106 |

Fill time of 2 minutes, Squeeze time of 3 minutes @ 15 bar, Air blow time of 5 minutes

Example 3

An aqueous slurry of aragonitic PCC having a solids content of about 15 weight percent was treated with 0.2 weight percent, based on the weight of the calcium carbonate, by adding the TERGITOL D-683 surfactant while stirring the aqueous slurry. The percent solids of the filter cake were measured and compared to an untreated PCC filter cakes (no surfactant). The results are shown in Table 3.

TABLE 3

| TERGITOL D-683 @ 0.2 weight % | | No Additive | |
|---|---|---|---|
| Cycle # | % Solids | Cycle # | % Solids |
| 1 | 67.78 | 1 | 53.61 |
| 2 | 67.21 | 2 | 50.92 |
| 3 | 69.95 | 3 | 51.03 |
| 4 | 68.00 | 4 | 51.27 |
| | | 5 | 51.69 |

TABLE 3-continued

| TERGITOL D-683 @ 0.2 weight % | | No Additive | |
|---|---|---|---|
| Cycle # | % Solids | Cycle # | % Solids |
| | _ = 68.24 | | _ = 51.70 |
| | σ = 1.191 | | σ = 1.106 |

Fill time of 2 minutes, Squeeze time of 3 minutes @ 15 bar, Air blow time of 5 minutes

Example 4

In the same manner as Examples 1–3, an aqueous slurry containing 15 weight percent aragonitic calcium carbonate was treated with TERGITOL MIN-FOAM 2X in one instance, and in another instance, the aqueous calcium carbonate slurry was treated with TERGITOL D-683. Treatment levels were 0.2 weight percent based on the weight of the calcium carbonate. The dispersed calcium carbonate products of the invention are compared to an untreated (no additive) calcium carbonate slurry filtration cake product in Table 4. The results show that the non-ionic treated invention products exhibit improved dispersant demand at essentially the same solids and particle size over the untreated control.

TABLE 4

| Sample ID | Dispersant Demand | SSA (m2/g) | PSD 90 ($\mu$) | PSD 50 ($\mu$) | % Solids |
|---|---|---|---|---|---|
| PCC - No Additive | 0.35% | 12.6 | 0.89 | 0.31 | 71.28 |
| PCC with TERGITOL MIN-FOAM 2X | 0.33% | 11.9 | 0.91 | 0.31 | 70.10 |
| PCC with TERGITOL D-683 | 0.29% | 11.8 | 0.89 | 0.31 | 71.15 |

We claim:

1. A method of removing water from an aqueous slurry of calcium carbonate consisting of:
   (a) forming an aqueous slurry of precipitated calcium carbonate having an average particle size less than or equal to about 1.6 microns;
   (b) treating the calcium carbonate with from about 0.1 weight percent to about 0.4 weight percent based on weight of the calcium carbonate of non-ionic surfactant; and
   (c) filtering the treated calcium carbonate to obtain a weight solids level of from about 55 to about 80 weight percent.

2. The method of claim 1 wherein the precipitated calcium carbonate is aragonite.

3. The method of claim 2 wherein the non-ionic surfactant is selected from a group consisting of polyalkylene glycol ether, alcohol alkoxylate, and alkylphenolhydroxypolyoxyethylene.

4. The method of claim 1 wherein the filtering obtains a weight solids level of at least 65 weight percent.

* * * * *